(12) United States Patent
Suzuki et al.

(10) Patent No.: US 7,270,365 B2
(45) Date of Patent: Sep. 18, 2007

(54) SPARE TIRE STORAGE STRUCTURE

(75) Inventors: Shinya Suzuki, Yokohama (JP); Hideo Hagiwara, Sagamihara (JP); Toshiharu Suzuki, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/586,515

(22) Filed: Oct. 26, 2006

(65) Prior Publication Data
US 2007/0096488 A1 May 3, 2007

(30) Foreign Application Priority Data
Oct. 27, 2005 (JP) ............................ 2005-312300

(51) Int. Cl.
*B62D 43/10* (2006.01)
(52) U.S. Cl. ................................. 296/187.08; 296/37.2
(58) Field of Classification Search ............ 296/187.03, 296/187.05, 187.08, 193.07, 37.2, 37.14, 296/187.11
See application file for complete search history.

(56) References Cited

U.S. PATENT DOCUMENTS

| | | | | |
|---|---|---|---|---|
| 4,533,169 A | * | 8/1985 | Rauthmann et al. | 296/37.2 |
| 5,419,609 A | * | 5/1995 | Kmiec et al. | 296/187.11 |
| 6,231,097 B1 | * | 5/2001 | Schell et al. | 296/37.2 |
| 2002/0185881 A1 | * | 12/2002 | Kosuge et al. | 296/37.2 |
| 2006/0119125 A1 | * | 6/2006 | Muthigi et al. | 296/37.2 |

FOREIGN PATENT DOCUMENTS

JP          2004-58696 A          2/2004

* cited by examiner

Primary Examiner—Jason S Morrow
(74) Attorney, Agent, or Firm—Foley & Lardner LLP

(57) ABSTRACT

A spare tire storage structure for a vehicle, in which a spare tire is placed horizontally on a rear floor of the vehicle with a part thereof projected upward from a main surface of the rear floor. The structure includes: a guide stopper provided adjacent to and in front of the spare tire, which deforms to be bent upon contact with a front portion of the spare tire that is moved forward in a vehicle collision, and lifts and guides the front portion of the spare tire upward. A portion of the guide stopper that deforms to be bent is configured to absorb a kinetic energy generated by the forward movement of the spare tire.

14 Claims, 9 Drawing Sheets

SPARE TIRE STORAGE STRUCTURE

BACKGROUND OF THE INVENTION

1. Field of the Invention

The present invention relates to a spare tire storage structure on a rear floor of a vehicle.

2. Description of the Related Art

A generally employed spare tire storage structure on a rear floor includes a spare tire pan formed in a floor panel, which has a depth equivalent to a width of the spare tire. The spare tire is horizontally placed within the spare tire pan and stored under the main surface of the rear floor.

Japanese Patent Application Laid-Open Publication No. 2004-58696 discloses a structure including a spare tire pan having an inclined wall formed at the front end of the spare tire pan, and a plate member extending rearward from the upper edge of the inclined wall, wherein the inclined wall serves to lift up the front portion of the spare tire which is moved forward due to a vehicle rear-end collision, and the resultant lifting force acts to bend the plate member such that the kinetic energy of the spare tire is absorbed.

SUMMARY OF THE INVENTION

In the aforementioned spare tire storage structure, the spare tire pan is required to have sufficient depth to have the spare tire entirely accommodated therein, and the inclined wall has to be provided at the front end of the spare tire pan in order to lift up the front portion of the spare tire upon the rear-end collision.

However, the afore-mentioned spare tire storage structure cannot be employed to the vehicle having a short rear overhung, since it is difficult to form the spare tire pan having sufficient depth within the limited underfloor space thereof.

The present invention is made in the light of the above-mentioned problem. It is an object of the present invention to provide a spare tire storage structure capable of storing a spare tire even with a small underfloor space and efficiently guiding a front portion of the spare tire that is moved forward due to the rear-end collision, in an upward oblique direction.

An aspect of the present invention is a spare tire storage structure for a vehicle, in which a spare tire is placed substantially horizontally on a rear floor of the vehicle with a part thereof projected upward from a main surface of the rear floor, the structure comprising: a guide stopper provided adjacent to and in front of the spare tire, which deforms to be bent upon contact with a front portion of the spare tire that is moved forward in a vehicle collision, and lifts and guides the front portion of the spare tire upward, wherein a portion of the guide stopper that deforms to be bent is configured to absorb a kinetic energy generated by the forward movement of the spare tire.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
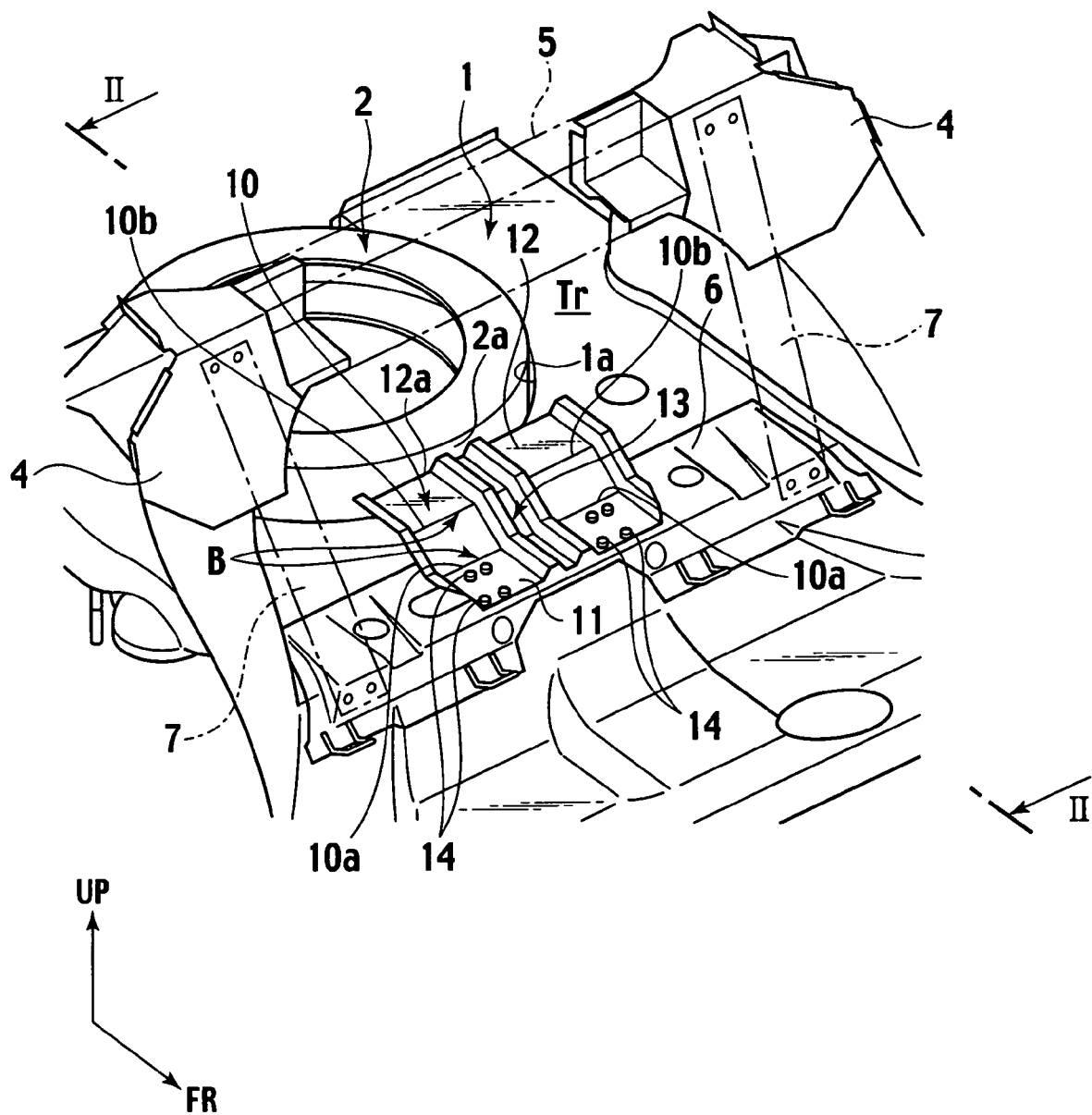
FIG. 1 is a perspective view of a rear floor that stores a spare tire according to a first embodiment of the present invention when viewed from the upper front of the vehicle.

Embodiments of the present invention will be explained below with reference to the drawings, wherein like members are designated by like reference characters.

Figure 2:
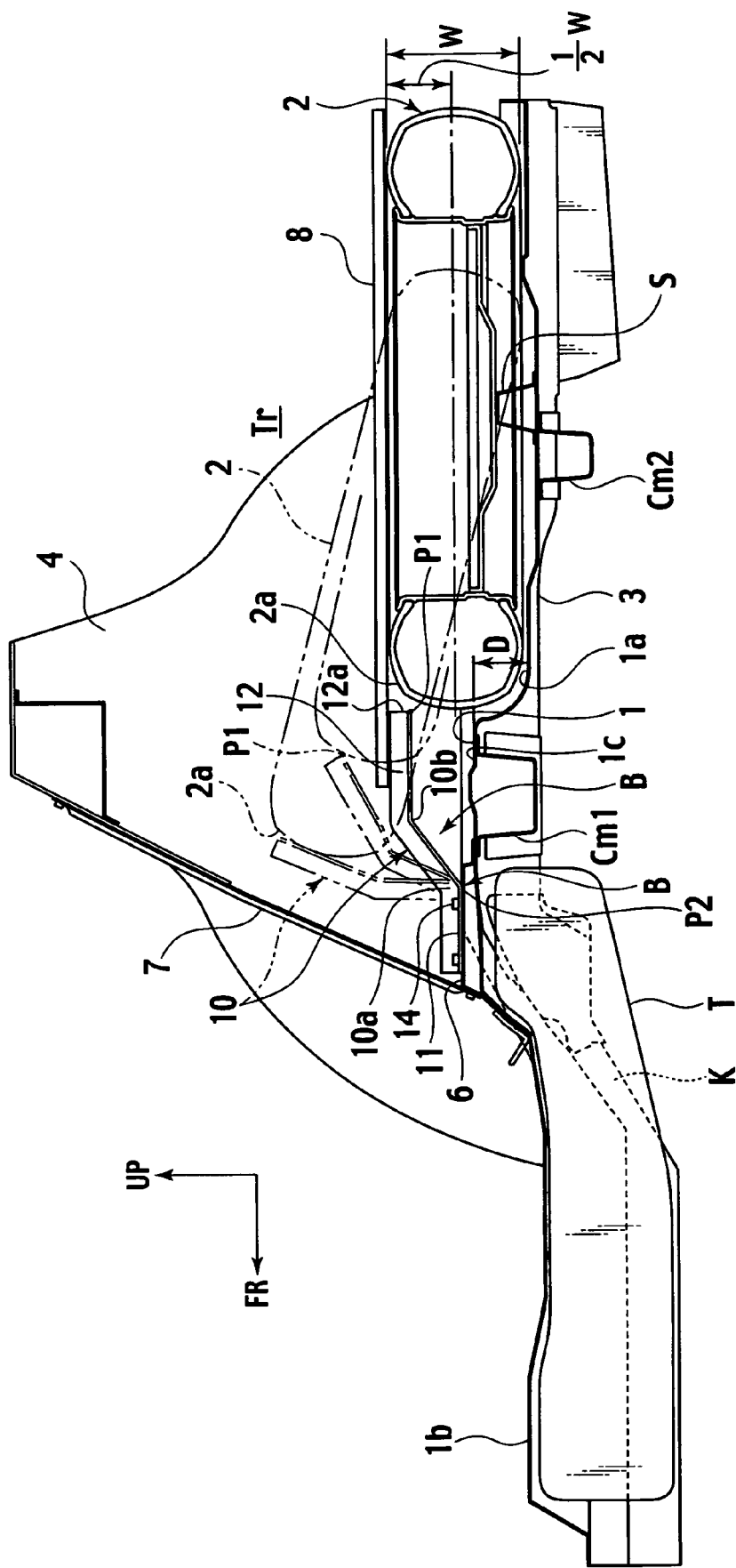
FIG. 2 is an enlarged sectional view taken along line II-II of FIG. 1.
Figure 3:
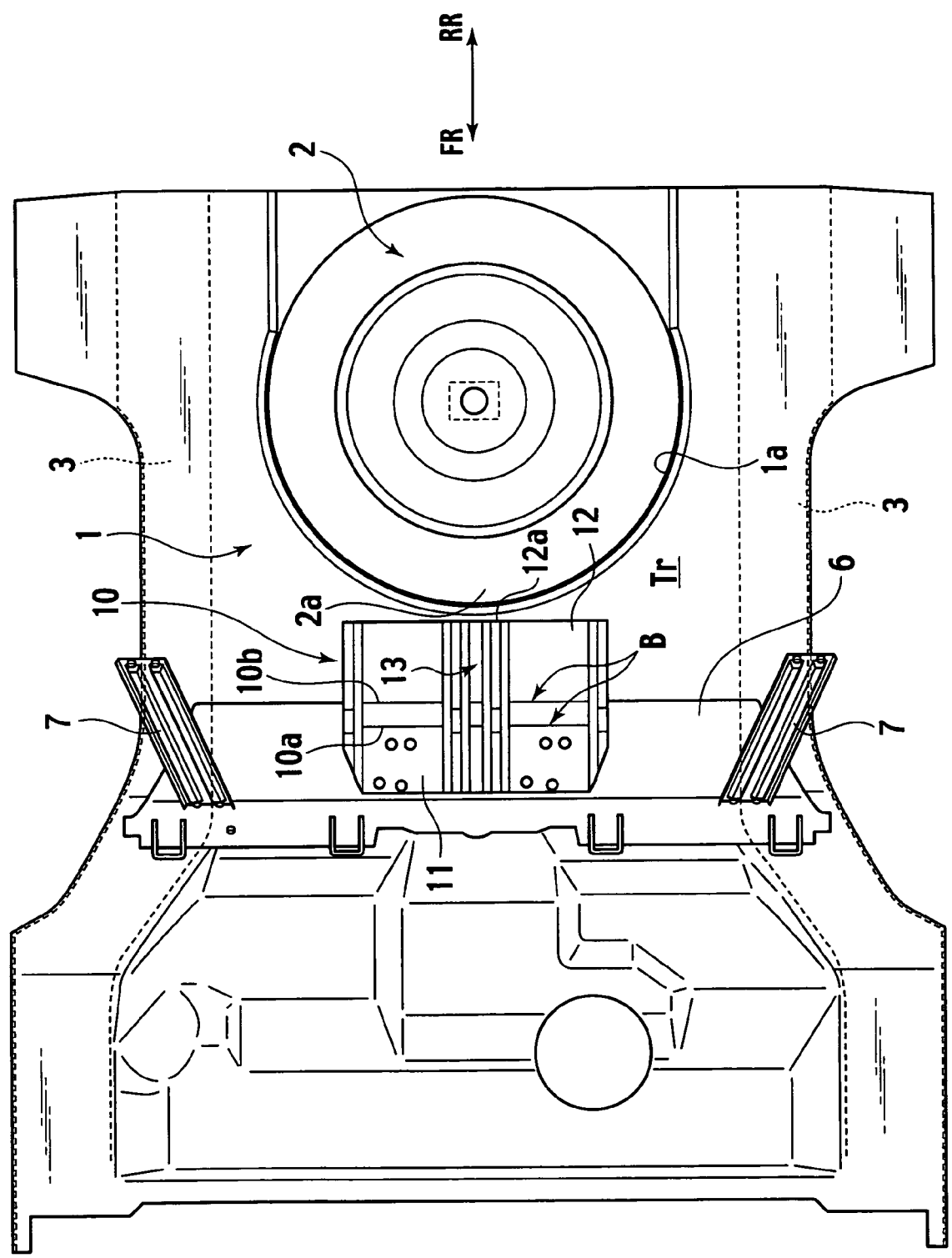
FIG. 3 is a plan view of the rear floor that stores the spare tire according to the first embodiment of the present invention.

Referring to FIGS. 1 to 3, in a spare tire storage structure of the first embodiment, a spare tire 2 is stored in a center portion of a rear floor 1 in a vehicle transverse direction within a trunk room Tr to the rear of a vehicle body.

Referring to FIG. 3, a pair of left and right side members 3 each extending in the longitudinal direction of the vehicle are provided on the lower surface of the rear floor 1 at both transversely outer sides of the rear floor 1. A kick-up portion K at the front portion of the rear floor 1 allows those side members 3 to be inclined from the rear floor 1 toward a center floor 1b of a cabin compartment.

A pair of left and right strut towers 4 are provided on both transversely outer sides of the rear floor 1 near the front portion thereof. A strut tower bar 5 is connected between upper end portions of the left and right strut towers 4 so as to improve a torsional stiffness of the rear portion of the vehicle body.

The front portion of the rear floor 1 is provided with an overfloor member 6 that extends in the vehicle transverse direction on the rear floor 1, having both end portions connected to the side members 3, and forms a part of a frame of the vehicle body. A pair of seat back support frames 7 are respectively connected to and between the upper end portions of the corresponding strut towers 4 and the end portions of the overfloor member 6. The seat back of the rear seat (not shown) is attached to the seat back support frames 7.

The overfloor member 6 is provided on the rear floor 1 in a position directly above a rear suspension (not shown) below the rear floor 1, and improves the support stiffness of the rear suspension in the vehicle transverse direction.

A first cross member Cm1 is provided on a lower surface of the rear floor 1, near the overfloor member 6 and in the rear side of the underfloor member 6, and a second cross member Cm2 is provided on the lower surface of the rear floor 1 beneath the storage portion for the spare tire 2. A seat S of bolt for fixing the spare tire 2 is provided on the upper surface of the rear floor 1 at a position corresponding to the center of the spare tire 2 that has been stored.

Referring to FIG. 2, the upper side of the spare tire 2 placed on the upper surface of the rear floor 1 is detachably covered with a floor board 8 that serves as a bottom surface of the trunk room Tr.

The spare tire 2 is basically placed substantially horizontally on the upper surface of the rear floor 1 with a part thereof protruding upward from a main surface 1c of the upper surface of the rear floor 1. In the embodiment, the rear floor 1 is provided with a shallow recess portion 1a having a step-like shape in section and extending along the outer periphery of the spare tire 2, that reduces the height above ground of the portion of the rear floor 1 for storing the spare tire 2 and keeps the stored spare tire 2 in a position on the rear floor 1. The spare tire 2 is thus placed in the recess portion 1a. A depth D of the recess portion 1a is smaller than a width W of the spare tire 2.

In the embodiment, a guide stopper 10 is provided adjacent to and in front, in the longitudinal direction of the vehicle, of the front portion of the spare tire 2 that has been stored. The guide stopper 10 is brought into contact with a front side 2a of the front portion of the spare tire 2 that is moved forward relative to the rear floor 1 and/or the seat back support frames 7 in a vehicle rear-end collision. The guide stopper 10 is then deformed to be bent and/or flexed to lift the front portion of the spare tire 2 and to guide the front portion upward. A resultant bent portion B of the guide stopper 10 is subjected to adjustment of the bending stiffness thereof so as to efficiently absorb the kinetic energy generated by the forward movement of the spare tire 2.

The guide stopper 10 includes one or more bending axes 10a and 10b (two axes in the embodiment) each extending in the vehicle transverse direction. The guide stopper 10 is bent and/or flexed by the moment generated around the respective bending axes 10a and 10b, in a manner to control the relative movement path of the spare tire 2.

That is, the bending axes 10a and 10b are arranged at a predetermined interval L in the center of the guide stopper 10 in the longitudinal direction of the vehicle. The bending axis 10a is positioned at the front of the guide stopper 10 when seen from above, while the bending axis 10b is positioned at the rear of the guide stopper 10. Referring to FIG. 5B, the guide stopper 10 is form to have a valley-like shape along the front bending axis 10a, and to have a mountain-like shape along the rear bending axis 10b. The guide stopper 10 is thus formed with the attachment portion 11 on the front side of the front bending axis 10a and the spare tire contact portion 12 on the rear side of the rear bending axis 10b, which are arranged in substantially parallel with each other. Then an inclined surface with its width L is defined between the attachment portion 11 and the spare tire contact portion 12.

Referring to FIG. 2, the front portion of the floor board 8 is supported on the spare tire contact portion 12, and the guide stopper 10 serves as a portion for supporting the front portion of the floor board 8, whereby the height raising material (normally foamed material) conventionally employed for the floor board 8 is eliminated.

Figure 4:
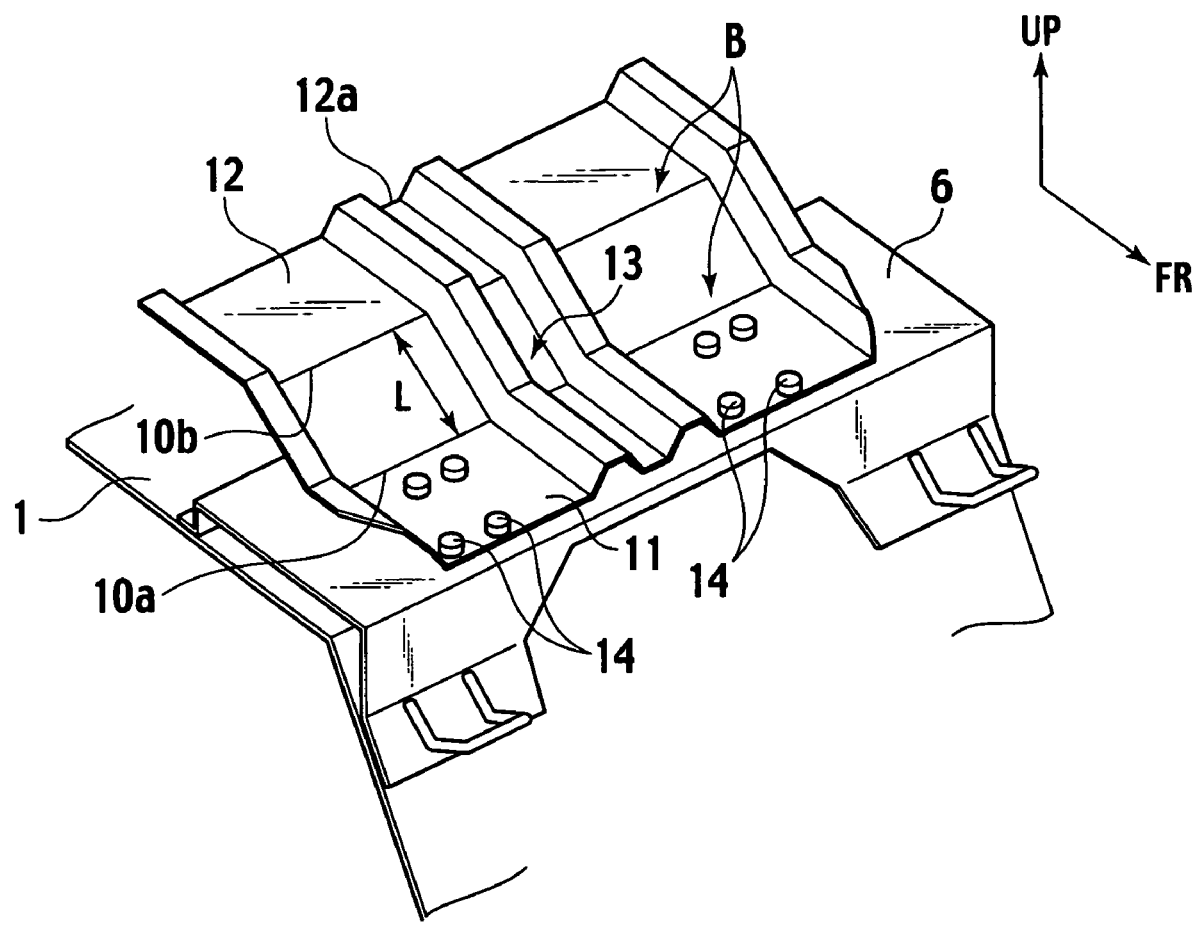
FIG. 4 is a perspective view that shows an attachment structure of a guide stopper according to the first embodiment of the present invention.
Figure 5A:
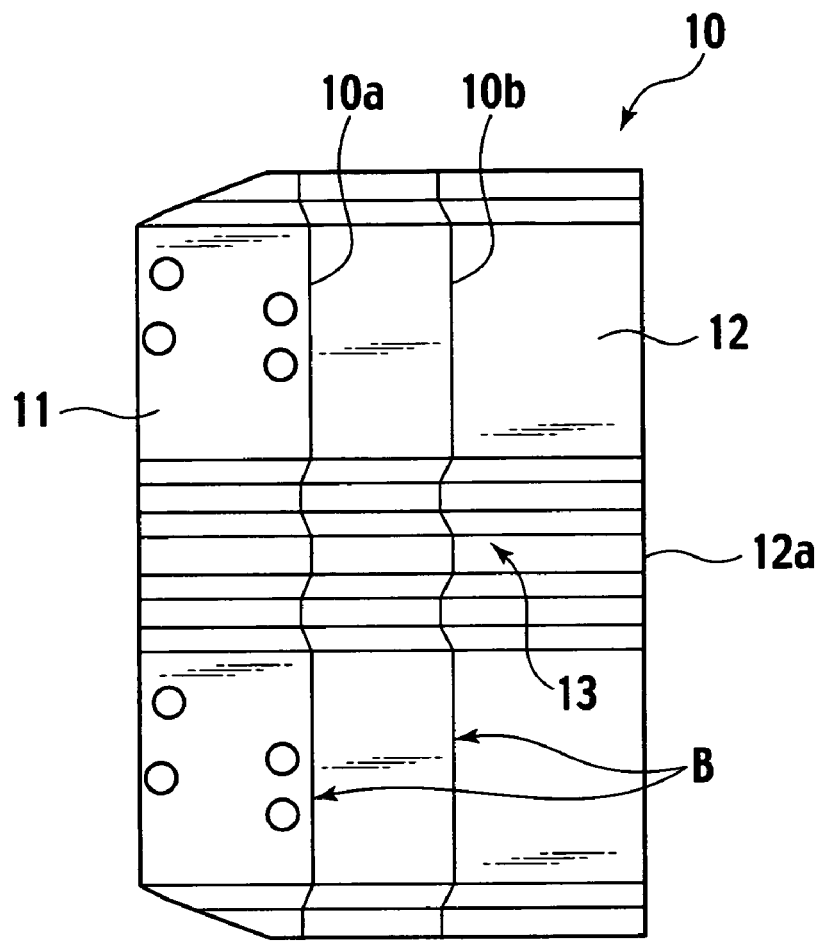
FIG. 5A is a plan view of the guide stopper according to the first embodiment of the present invention.
Figure 5B:
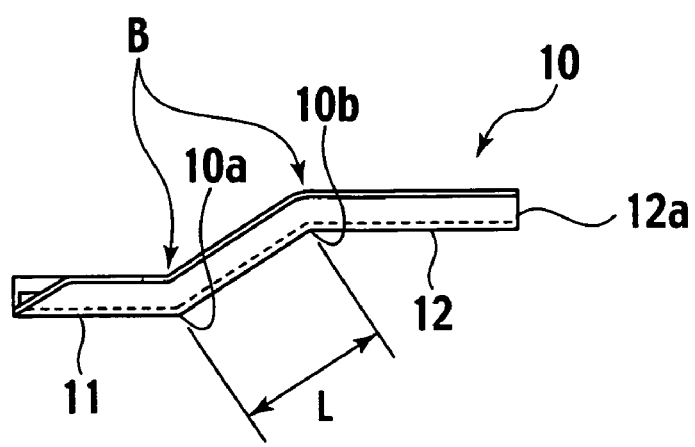
FIG. 5B is a side view of the guide stopper according to the first embodiment of the present invention.

Referring to FIGS. 4, 5A and 5B, the guide stopper 10 is generally formed of a plate member which has a rectangular shape in plan view and provided with beads 13 each extending in the longitudinal direction of the vehicle.

Each of the beads 13 is provided on the guide stopper 10 at the position to be in contact with the spare tire 2 in the vehicle transverse direction, that is, at the center of the guide stopper 10 in the vehicle transverse direction.

The guide stopper 10 is arranged at the rear of the vehicle such that the rear edge 12a of the spare tire contact portion 12 faces the front side 2a of the spare tire 2 placed on the recess portion 1a. The attachment portion 11 provided on the front of the guide stopper 10 is attached onto the upper surface of the overfloor member 6 using a fastener such as bolts 14.

The spare tire contact portion 12 of the guide stopper 10 is arranged such that the contact between the front side 2a of the spare tire 2 and the rear edge 12a of the spare tire contact portion 12 generates the component force in the forward upward oblique direction thereat. In the embodiment, the rear edge 12a of the substantially horizontally positioned spare tire contact portion 12 is brought into contact with the spare tire 2 at a point above the center line of the spare tire 2 in the width direction of the spare tire 2 (in the range within ½ W from the upper surface of the spare tire 2). A contact point P1 between the rear edge 12a of the spare tire contact portion 12 and the front side 2a of the spare tire 2 is positioned on upper and front side of the line passing through a fixation point P2 at which the attachment portion 11 of the guide stopper 10 is fixed to the overfloor member 6, and a point of action P3 at which the load inputted to the spare tire 2 acts upon rear-end collision.

In the aforementioned spare tire storage structure according to the embodiment, when the spare tire 2 moves forward relative to the vehicle body due to the rear-end collision, the front side 2a of the spare tire 2 comes into contact with the rear edge 12a of the spare tire contact portion 12 of the guide stopper 10 provided at the position near and in front of the spare tire 2. Then a load generated by the rear-end collision is inputted to the guide stopper 10 via the spare tire 2, and the guide stopper 10 is deformed by the load to be bent at the front and rear bending axes 10a and 10b as shown by a chain-double dashed line in FIG. 2, specifically, valley fold and mountain fold are formed in parallel with each other on the same side surface of the guide stopper 10.

The component force in the forward upward oblique direction is then imposed on the spare tire contact portion 12, which serves to lift up the front portion of the spare tire 2 while keeping the rear edge 12a of the spare tire contact portion 12 in contact with the front side 2a of the spare tire 2.

The guide stopper 10 guides the front portion of the spare tire 2 moving further forward, and changes the direction of the movement of the front portion to the forward upward oblique direction, rotating the spare tire 2 clockwise in FIG. 2. The distance of the forward movement of the spare tire 2 can be minimized through the function of absorbing the kinetic energy provided at the bent portion B of the guide stopper 10.

In the spare tire storage structure of the embodiment, the guide stopper 10 is added to position the spare tire 2 on the rear floor 1 and to lift and guide the spare tire 2 upward without forming the spare tire pan for storing the entire spare tire 2. Even if the vehicle has a short rear overhung, and little degree of freedom in the under floor layout, the invention is applicable so long as a space for attaching the guide stopper 10 in front of the stored spare tire 2 is provided.

As the spare tire 2 is moved forward while being lifted in the forward upward oblique direction upon the rear-end collision, the space for accommodating the crush due to the rear-end collision can be formed in the rear portion of the vehicle body. The crush space efficiently absorbs the collision energy, preventing the crush of the attachment portion of the fuel tank T installed under a forward extension of the rear floor 1, as well as suppressing a collision load input to the kick-up portion K of the side member 3.

In addition to the aforementioned advantages, the guide stopper 10 includes one or more bending axes 10a and 10b each extending in the vehicle transverse direction. The moment generated around the respective bending axes 10a and 10b serves to bend the guide stopper 10 in a manner that the guide stopper 10 can control the movement path of the spare tire 2. This makes it possible to effectively guide the front portion of the forwardly moving spare tire 2 in the forward upward oblique direction with a simple structure.

The guide stopper 10 is generally formed of the plate member having a substantially rectangular shape in plan view, and the beads 13 extending in the vehicle longitudinal direction are formed in the plate member. As the beads 13 improve the rigidity of the guide stopper 10, thickness of the plate member may be reduced for weight saving.

As the beads 13 are formed on the portion of the guide stopper 10 to be brought into contact with the spare tire 2, rigidity of the portion of the guide stopper 10 to which a large load is inputted upon the contact with the spare tire 2 is enhanced. This makes it possible to further reliably control the movement path of the spare tire 2.

As the guide stopper 10 is attached onto the overfloor member 6 that extends in the vehicle transverse direction and has both end portions connected to the side members 3, respectively, to form a part of the vehicle frame. Since, the guide stopper 10 is thus fixed to the portion that exhibits high rigidity, it is possible to suppress deformation of the floor of the vehicle body.

Figure 6A:
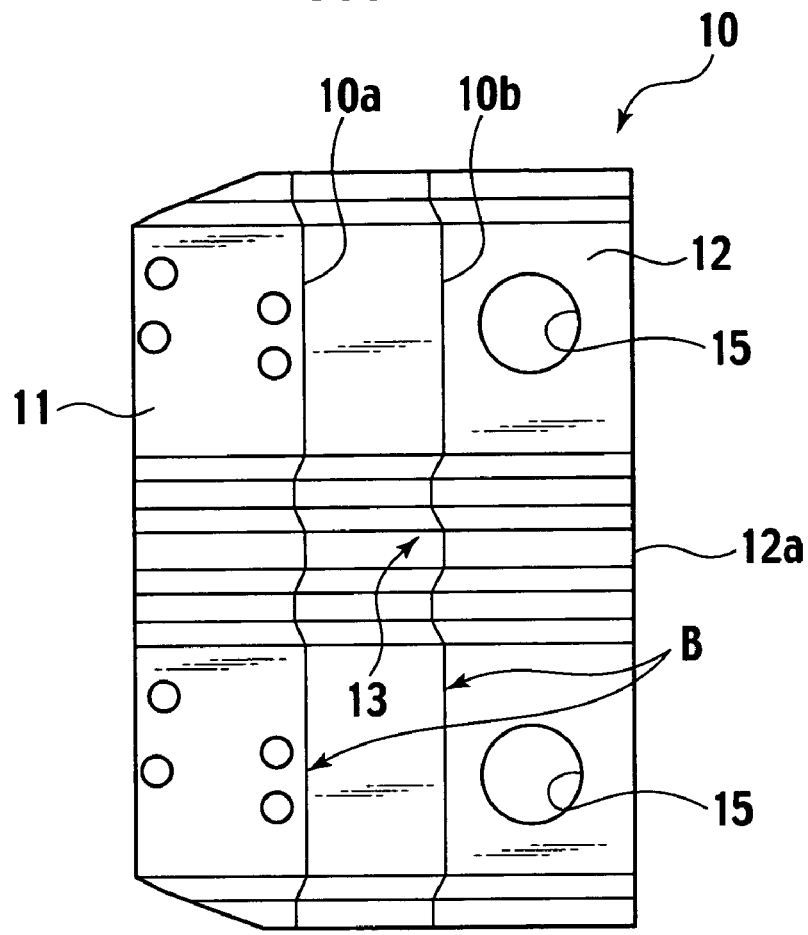
FIG. 6A is a plan view of a guide stopper of a first modified example of the first embodiment.
Figure 6B:
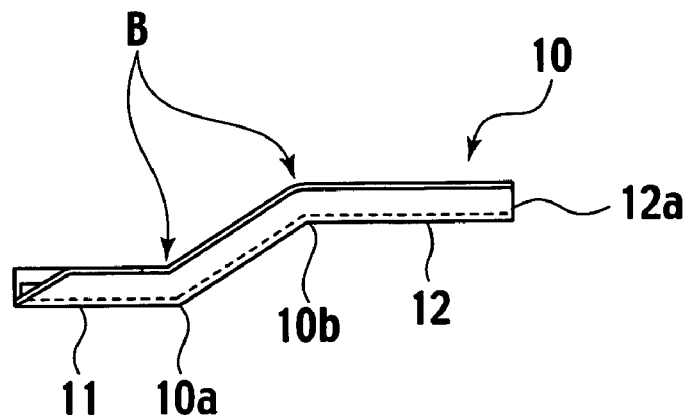
FIG. 6B is a side view of the guide stopper of the first modified example of the first embodiment.

FIG. 6 shows a first modified example of the first embodiment. The spare tire contact portion 12 of the guide stopper 10 has openings 15 that allow a tread of the spare tire 2 to be engaged therewith.

Accordingly, in the first modified example, as shown by the chain-double dashed line in FIG. 2, in the case where the spare tire 2 moves forward by a predetermined distance to raise the guide stopper 10 to a certain degree, and the front side 2a of the spare tire 2 comes into face contact with the bottom surface of the spare tire contact portion 12, the tread of the spare tire 2 is engaged with inside edges of the openings 15. Accordingly, the front portion of the spare tire 2 may be guided toward a predetermined direction without being slipped and dropped from the guide stopper 10.

The tread refers to a concave-convex pattern made and cut in the outer periphery of the spare tire 2. The opening 15 does not have to be formed into a circular shape as shown in the drawing, but may be formed into an arbitrary shape adapted to the tread, for example, polygonal shape.

Figure 7:
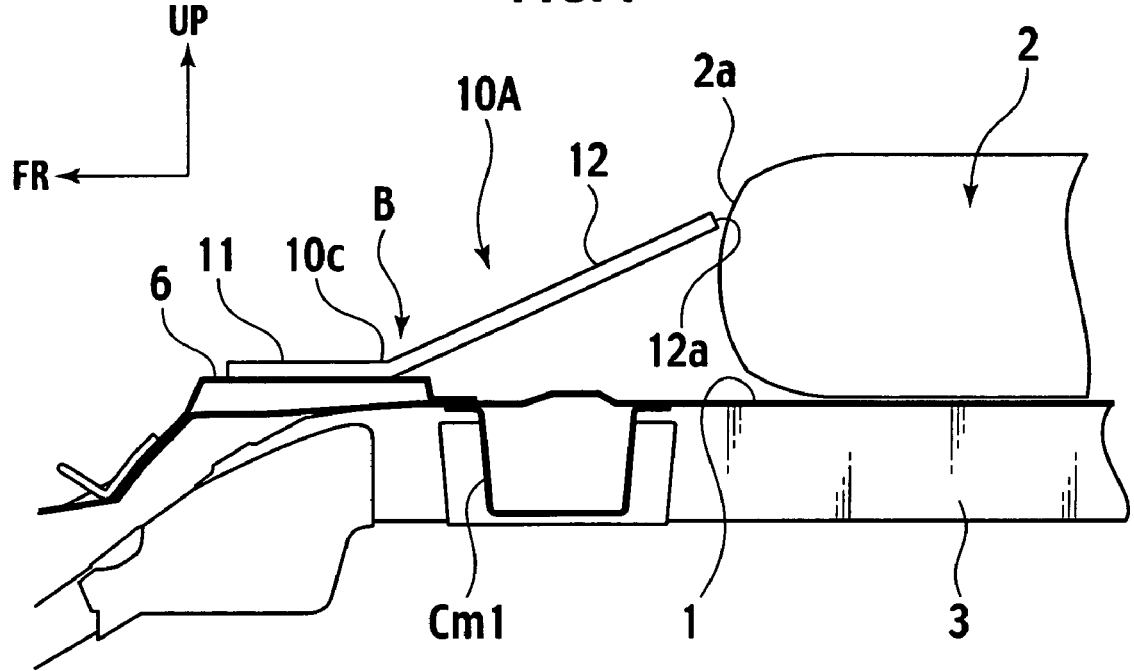
FIG. 7 is a side view that shows a state where a guide stopper is attached in a second modified example of the first embodiment.
Figure 8:
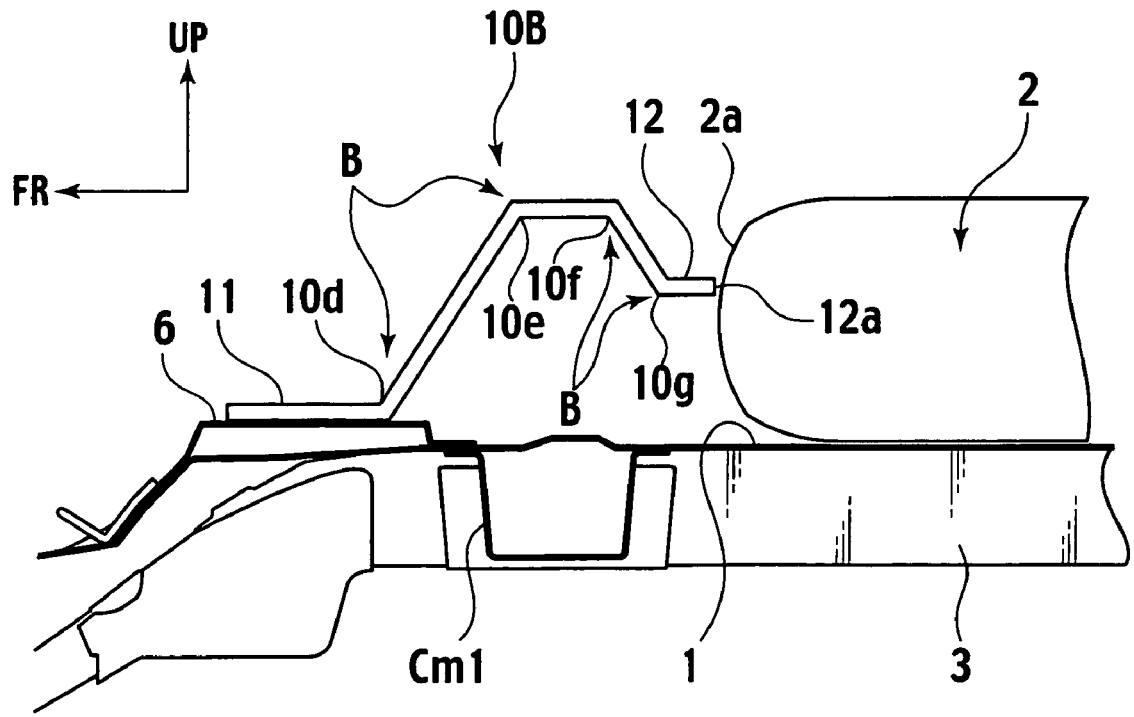
FIG. 8 is a side view that shows a state where a guide stopper is attached in a third modified example of the first embodiment.

FIGS. 7 and 8 shows second and third modified examples of the first embodiment, respectively.

In the second modified example as shown in FIG. 7, a guide stopper 10A is provided with a bending axis 10c, and the attachment portion 11 to the front of the bending axis 10c. The spare tire contact portion 12 of the guide stopper 10A is provided to the rear of the bending axis 10c.

In the third modified example as shown in FIG. 8, a guide stopper 10B is provided with four bending axes 10d, 10e, 10f, and 10g arranged at predetermined intervals in the longitudinal direction of the vehicle, and the attachment portion 11 to the front of the bending axis 10d that is arranged at the most front position. The spare tire contact portion 12 of the guide stopper 10B is provided to the rear of the bending axis 10g arranged at the most rear position.

Each of the guide stoppers 10A and 10B of the second and the third modified examples is bent upon contact with the front side 2a of the spare tire 2 that is moved forward, and serves to lift and guide the front portion of the spare tire 2 upward. Each bent portion B exhibits the function of absorbing the kinetic energy. Referring to FIGS. 7 and 8, the storage portion for the spare tire 2 of the rear floor 1 is formed to be flat.

Accordingly, the second and the third modified examples provide the same advantages as those of the first embodiment. If the spare tire 2 moves forward due to the rear-end collision, the component force in the forward upward oblique direction is generated at the spare tire contact portion 12 which directs the front portion of the spare tire 2 to the same direction as that of the component force. The distance of the forward movement of the spare tire 2 is minimized by the function of absorbing the kinetic energy of the bent portion B of the guide stopper 10.

The first embodiment, and the first to third modified examples thereof include the guide stopper 10 provided with two bending axes 10a and 10b, the guide stopper 10A provided with one bending axis 10c, and the guide stopper 10B provided with four bending axes 10d to 10g, respectively. However, the invention may be applied to the guide stopper that employs other type of the bending axis.

Figure 9:
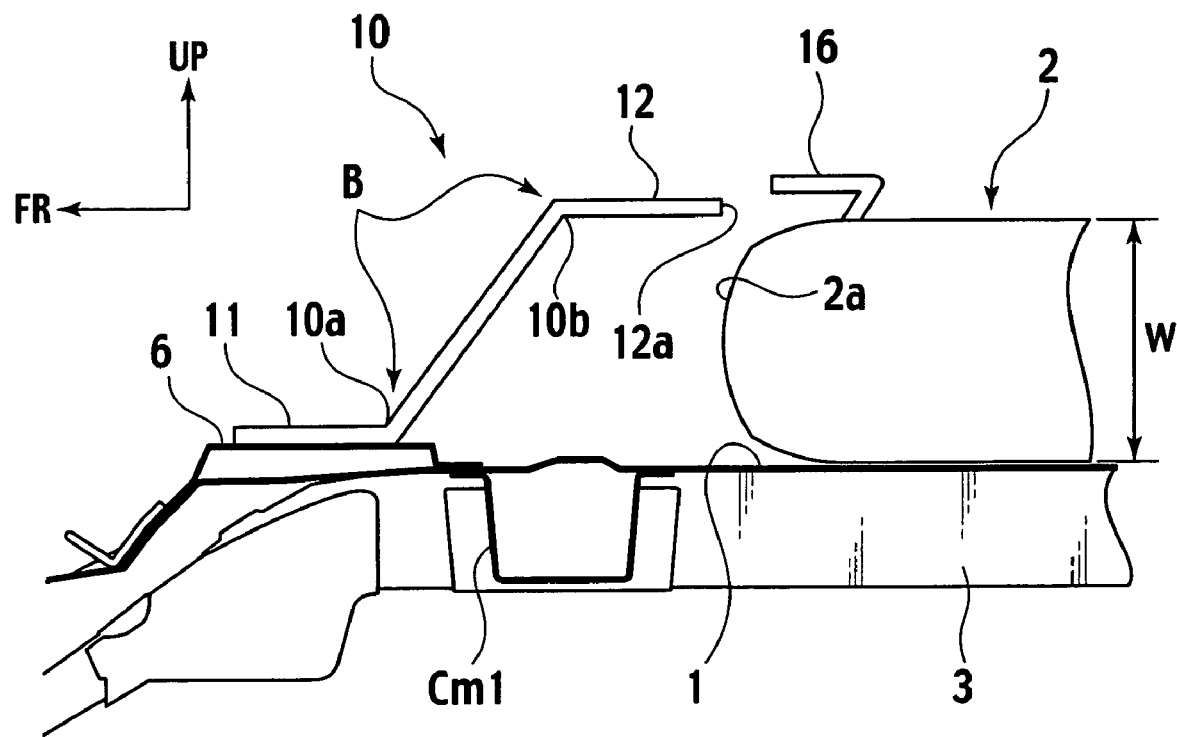
FIG. 9 is a side view that shows a state where a guide stopper is attached in a second embodiment of the present invention.

FIG. 9 shows a second embodiment of the invention. The same elements as those of the first embodiment will be designated with the same reference numerals, and the explanations thereof, therefore, will be omitted.

Likewise the first embodiment, in the spare tire storage structure of the second embodiment, the guide stopper 10 is attached onto the overfloor member 6 near the spare tire 2 and in front of the spare tire 2. When the spare tire 2 moves forward, the rear edge 12a of the guide stopper 10 comes into contact with the front side 2a of the spare tire 2, whereby the front portion of the spare tire 2 is lifted and guided upward. The bent portion B of the guide stopper 10 also exhibits a kinetic energy absorbing function.

Especially, in the embodiment as shown in FIG. 9, the spare tire 2 is provided with a hook 16 that is to be engaged with the rear end portion of the guide stopper 10, that is, the rear edge 12a of the spare tire contact portion 12. In the embodiment, the storage portion for the spare tire 2 of the rear floor 1 is formed to be flat.

More specifically, the hook 16 is bent into a substantially L-like shape open to the front of the vehicle, and is detachably attached to a part of the spare tire 2 opposite the rear end portion of the guide stopper 10, for example, to the upper road wheel fixedly. In the case where the spare tire 2 moves forward, the hook 16 is robustly engaged with the rear end portion of the guide stopper 10.

Therefore, in the spare tire storage structure according to the embodiment, when the spare tire 2 is moved forward due to the rear-end collision, the hook 16 is engaged with the rear end portion of the guide stopper 10 such that the engagement between the guide stopper 10 and the spare tire 2 is reliably held. This makes it possible to guide the spare tire 2 in the forward upward oblique direction without causing the spare tire 2 to slip from the guide stopper 10.

In the second embodiment, the guide stopper 10 includes two bending axes 10a and 10b. However, the guide stopper 10A including one bending axis 10c, or the guide stopper 10B including four bending axes 10d to 10g can be employed in the aforementioned structure. The present invention further can be applied with a guide stopper including other type of the bending axis.

Figure 10:
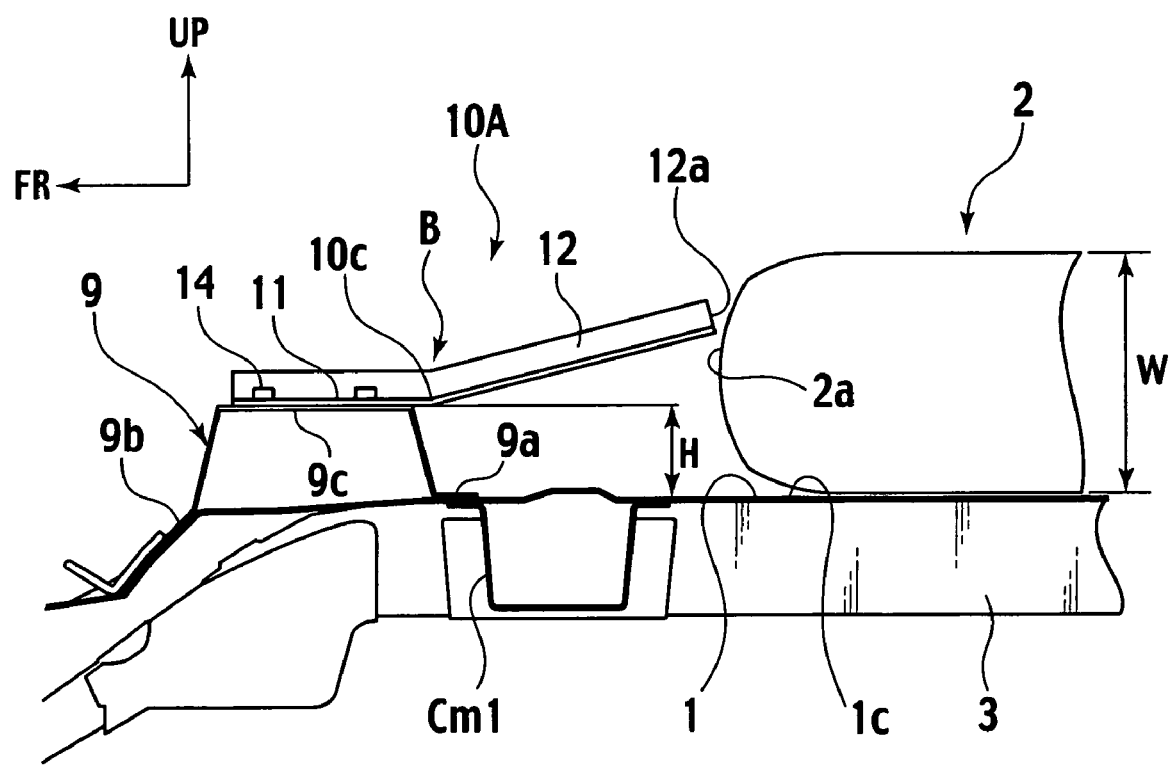
FIG. 10 is a side view that shows a state where a guide stopper is attached in a third embodiment of the present invention.

FIG. 10 shows a third embodiment of the invention. The same elements as those of the first embodiment will be designated with the same reference numerals, and explanations thereof, thus, will be omitted.

In the spare tire storage structure of the third embodiment, likewise the first embodiment, the guide stopper 10A is provided near the spare tire 2 and in front of the spare tire 2 such that the front portion of the forwardly moving spare tire 2 is lifted and guided upward.

In the third embodiment, the guide stopper 10A as shown in FIG. 10 is attached to a protruding portion 9 which is connected to the front part of the upper surface of the rear floor 1 and protruding from the main surface 1c of the upper front surface. In this embodiment, the storage portion for the spare tire 2 of the rear floor 1 is formed to be flat.

The protruding portion 9 has a downwardly opening hat-like shape in cross section and extends in the vehicle transverse direction. Flange portions 9a and 9b at the front and rear lower ends thereof are connected to the front part of the rear floor 1, and the attachment portion 11 of the guide stopper 10 is connected to the upper surface of a ceiling portion 9c of the protruding portion 9. The protruding portion 9 has a height H smaller than half the width W of the spare tire 2.

The protruding portion 9 constitutes a third cross member Cm3 connected to the side members 3 at transversely outer ends thereof.

Accordingly, in the spare tire storage structure of the embodiment, the guide stopper 10A is attached to the protruding portion 9 connected to the front upper surface of the rear floor 1. This allows the protruding portion 9 to receive the load inputted to the guide stopper 10A, and prevent direct input of the load to the rear floor 1, thus suppressing the deformation of the floor of the vehicle body.

As the protruding portion 9 constitutes the third cross member Cm3, rigidity of the attachment of the guide stopper 10A is improved so as to allow the guide stopper 10A to accurately control the movement path of the spare tire 2.

In this embodiment, the guide stopper 10A includes one bending axis 10c. However, the guide stopper 10 including two bending axes 10a and 10b or the guide stopper 10B including four bending axes 10d to 10g may be employed to the aforementioned structure. Further the invention allows the use of the guide stopper including other type of the bending axis.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2005-312300, filed on Oct. 27, 2005, the disclosures of which is expressly incorporated herein by reference in its entirety.

What is claimed is:

1. A spare tire storage structure for a vehicle, in which a spare tire is placed substantially horizontally on a rear floor of the vehicle with a part thereof protruding upward from a main surface of the rear floor, the structure comprising:
a guide stopper provided adjacent to and in front of the spare tire, which deforms to be bent upon contact between a rear portion thereof, which is located relatively distantly above the main surface of the rear floor and a front portion of the spare tire that is moved forward in a vehicle collision, and lifts and guides the front portion of the spare tire upward, wherein a portion of the guide stopper that deforms to be bent is configured to absorb kinetic energy generated by the forward movement of the spare tire.

2. The spare tire storage structure according to claim 1, wherein the guide stopper includes at least one bending axis extending in a vehicle transverse direction, and is to be bent by a moment generated around the at least one bending axis in a manner to control a movement path of the spare tire.

3. The spare tire storage structure according to claim 1, wherein the guide stopper is formed of a plate member having a bead formed thereon extending in a longitudinal direction of the vehicle.

4. The spare tire storage structure according to claim 3, wherein the bead is formed on a portion of the guide stopper to come into contact with the spare tire.

5. The spare tire storage structure according to claim 1, wherein a spare tire contact portion of the guide stopper to come into contact with the spare tire is provided with an opening with which a tread of the spare tire is engaged.

6. The spare tire storage structure according to claim 1, wherein the spare tire is provided with a hook that engages with a rear end portion of the guide stopper.

7. The spare tire storage structure according to claim 1, wherein the guide stopper is attached to an overfloor member extending in the vehicle transverse direction with end portions thereof respectively connected to side members to form a part of a frame of a body of the vehicle.

8. The spare tire storage structure according to claim 1, wherein the guide stopper is attached to a protruding portion connected to a front upper surface of the rear floor and protruding therefrom.

9. The spare tire storage structure according to claim 8, wherein the protruding portion forms a cross member extending in the vehicle transverse direction with end portions thereof respectively connected to side members.

10. A spare tire storage structure for a vehicle, in which a spare tire is placed substantially horizontally on a rear floor of the vehicle with a part thereof projected upward from a main surface of the rear floor, the structure comprising:
a guide stopper provided adjacent to and in front of the spare tire, which deforms to be bent upon contact with a front portion of the spare tire that is moved forward in a vehicle collision, and lifts and guides the front portion of the spare tire upward, wherein a portion of the guide stopper that deforms to be bent is configured to absorb a kinetic energy generated by the forward movement of the spare tire,
wherein a spare tire contact portion of the guide stopper to come into contact with the spare tire is provided with an opening with which a tread of the spare tire is engaged.

11. A spare tire storage structure for a vehicle, in which a spare tire is placed substantially horizontally on a rear floor of the vehicle with a part thereof projected upward from a main surface of the rear floor, the structure comprising:
a guide stopper provided adjacent to and in front of the spare tire, which deforms to be bent upon contact with a front portion of the spare tire that is moved forward in a vehicle collision, and lifts and guides the front portion of the spare tire upward, wherein a portion of the guide stopper that deforms to be bent is configured to absorb a kinetic energy generated by the forward movement of the spare tire,
wherein the spare tire is provided with a hook that engages with a rear end portion of the guide stopper.

12. A spare tire storage structure for a vehicle, in which a spare tire is placed substantially horizontally on a rear floor of the vehicle with a part thereof projected upward from a main surface of the rear floor, the structure comprising:
- a guide stopper provided adjacent to and in front of the spare tire, which deforms to be bent upon contact with a front portion of the spare tire that is moved forward in a vehicle collision, and lifts and guides the front portion of the spare tire upward, wherein a portion of the guide stopper that deforms to be bent is configured to absorb a kinetic energy generated by the forward movement of the spare tire,
- wherein the guide stopper is attached to an overfloor member extending in the vehicle transverse direction with end portions thereof respectively connected to side members to form a part of a frame of a body of the vehicle.

13. The spare tire storage structure according to claim 1, wherein the spare tire protrudes upward from a main surface of the rear floor such that the main surface of the rear floor lies on a plane that bisects the spare tire at about the middle of the thickness of the spare tire.

14. The spare tire storage structure according to claim 1, wherein the rear portion of the guide stopper is located a distance equal to about half the thickness of the spare tire above the main surface of the rear floor.

* * * * *